May 6, 1969      L. M. BROCK      3,442,030

DEVICE TO AID IN THE TEACHING OF READING

Filed Aug. 9, 1968

INVENTOR

LOUISE MURPHY BROCK

BY Jennings Bailey

ATTORNEY

May 6, 1969   L. M. BROCK   3,442,030
DEVICE TO AID IN THE TEACHING OF READING
Filed Aug. 9, 1968   Sheet 2 of 2
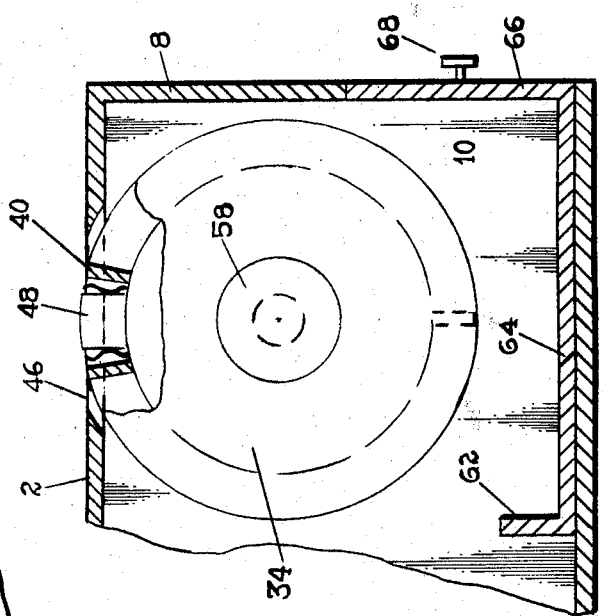
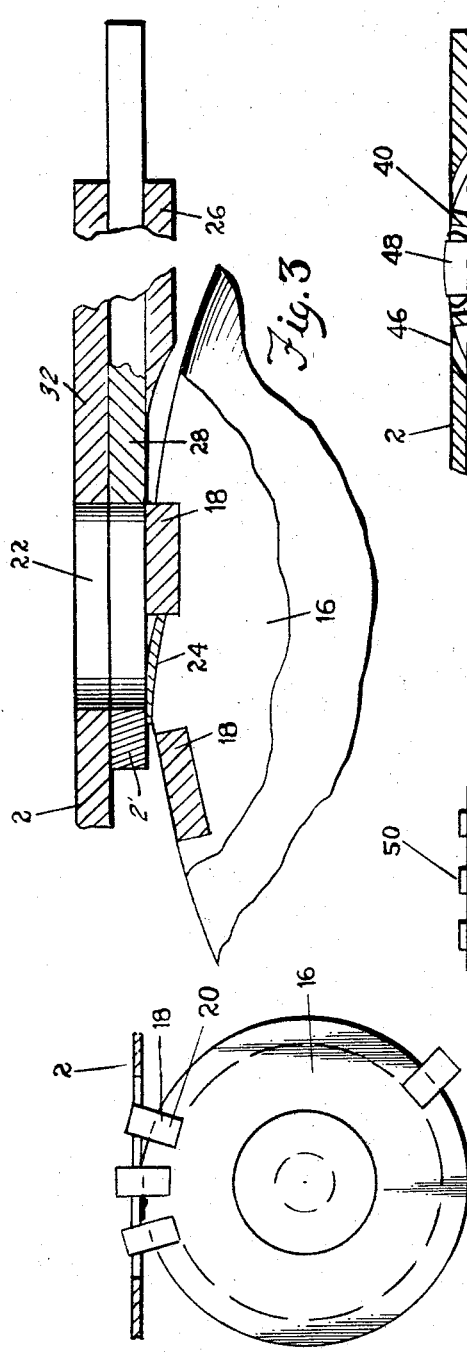
INVENTOR
LOUISE MURPHY BROCK
BY Jennings Bailey Jr.
ATTORNEY United States Patent Office 3,442,030
Patented May 6, 1969

3,442,030
DEVICE TO AID IN THE TEACHING OF READING
Louise Murphy Brock, Rte. 3, Belmont,
Gainesville, Ga. 30501
Filed Aug. 9, 1968, Ser. No. 751,406
Int. Cl. G09b 17/00
U.S. Cl. 35—35        9 Claims

ABSTRACT OF THE DISCLOSURE

For teaching reading, a pair of drums are mounted in a casing to turn about horizontal axes. One of the drums has a plurality of slats which are mounted to pass in front of openings in the top wall of the casing, the openings being substantially twice as wide as the slats. A strip is arranged to close the other half of the opening. The slats carry words which are legible through the openings, while no words are printed on the strip. Slides are manually movable from a position outside of each of the openings at the top to engage with blocks which are placed on the slats and are pushed by the slides onto the strip.

BACKGROUND OF THE INVENTION

Many devices are known for the teaching of reading in which words carried by blocks or other movable members are intended to be placed in different positions in correspondence with previously printed material.

SUMMARY OF THE INVENTION

The object of the present invention is to enable the teachings of words, spelling, sound and sentence structure to pre-school, kindergarten, first year and remedial children and to aid retarded children.

The invention in general involves a concept of having a student learn to recognize words by both feel, sight and sound and to pronounce them. For this purpose, blocks are used on which letters forming words are pasted, these letters being in the form, for example, of sandpaper, velvet or felt so that they can be felt by the fingers of the hand of the student.

The invention involves the use of a casing having a succession of openings therein running side-by-side in a line substantially parallel to the side wall casing at which the student is to sit. Within each opening is disclosed a space on which is inscribed a word, and a further space which is not imprinted with any word. A plurality of slides are arranged in the casing, one at each opening, these slides being movable horizontally to cross into or move out of the openings.

A plurality of blocks are provided, having words corresponding to the words shown in one-half of these openings. The thickness of the blocks is only half the thickness of the openings in the direction of movement of the slides, so that a block can be placed on the slide underneath the opening which bears a word, and then engaged by the slide and pushed onto the other part, thus uncovering the printed word on the part beneath the opening.

The blocks are carried by a member whose longitudinal axis corresponds to the longitudinal axis on the line of openings, and parallel to the direction of movement of the slide. This member has a groove in which the blocks having words corresponding to the words shown through the openings are held by spring clips, with magnets in the end of the blocks which engage against the spring clips.

Preferably, the device includes a pair of rotating members or drums, one of which is turnable about an axis parallel to the line of the first set of openings and carrying slats or strips on which the words exposed between the openings are printed, and a second drum rotatable about an axis parallel of the length of the second opening and having a plurality of grooves with spring clips therein for holding the blocks. The imprinted spaces beneath the first set of openings are formed by a resilient metallic strip. The slats, when the first drum is turned, move beneath and in contact with the metallic strip which thereafter by its resiliency is deflected slightly below the top of the exposed slat so that the blocks can be pushed by the slides to a position on top of the metal strip.

BRIEF DESCRIPTION OF THE DRAWINGS

Further objectives and advantages of the invention will appear more fully from the following description particularly when taken in conjunction with the accompanying drawings.

In the drawings:

FIG. 2 is an end view of the first drum, showing its relation to the top wall of the casing;

FIG. 3 is an enlarged view showing a part of the drum of FIG. 2 with the slats in cross section;

FIG. 4 is an end view, partly in section, of the second drum;

FIG. 5 is an enlarged cross section through a part of the drum of FIG. 4; and

FIG. 6 is a side elevation of one of the blocks.

DESCRIPTION OF THE PREFERRED EMBODIMENT

Figure 1:
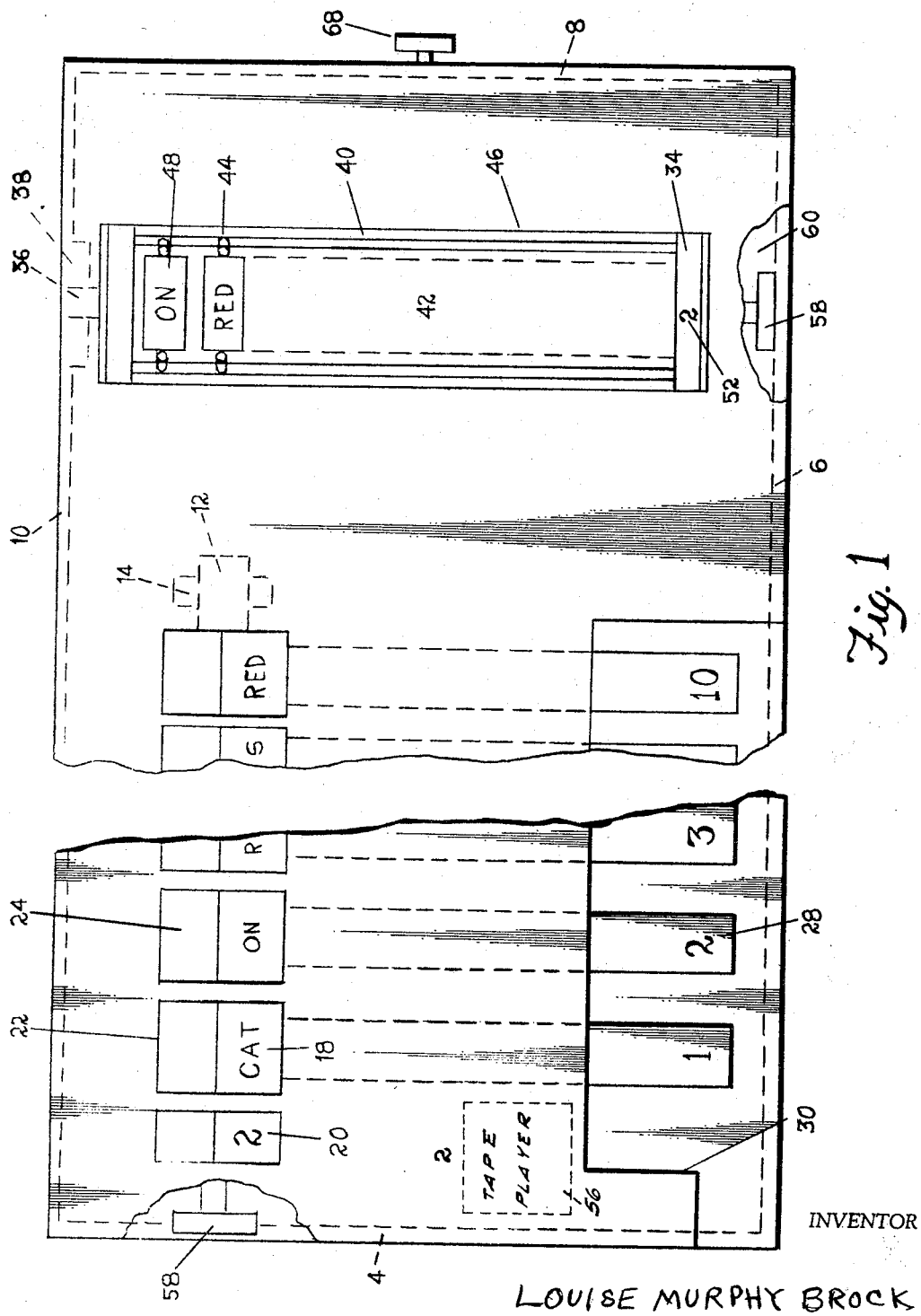
FIG. 1 shows in top plan view, partly broken away, a device embodying the invention.

The device includes a casing having a top wall 2, a left-hand end wall 4, a front wall 6, a right-hand end wall 8 and a back wall 10. A shaft 12 is mounted in bearings 14 to turn about an axis parallel to the front wall 6, and carries discs 16 between which runs slats 18 preferably spaced apart from each other by a distance substantially equal to their width. On the left-hand end of and aligned with each slat are upstanding projections 20, carrying on their ends different numerals to represent the number of the lesson carried by each slat. The top wall 2 of the casing has a plurality of openings 22 therein, arranged in a row parallel to the axis of the drum, through which the slats 18 are visible as the drum is turned. The slats are only half as wide as the length of the openings in the direction of rotation of the drum. Mounted on a part 2' fixed to the lower face of the top wall 2 furthest from the front wall is a resilient metal strip 24 which underlies one-half of each of the openings 22, and is free of printed words. This strip, as shown in FIG. 3, is bent downwards slightly at its free end so that as the drum turns each slat will pass under the free end of the strip, pushing it upwardly, whereas, when the slat has passed to the position shown in FIG. 3, the free end of the strip 24 will bend downwardly slightly below the upper surface of the slat.

Mounted between the top wall 2 and a guide member 26 which is fixed with respect to the casing are a plurality of slides 28, one opposite each of the openings 22. The ends of these slides nearest the front wall project into a cut out area 30 of the top wall 2, so that they are exposed and available to the user of the device for manipulation. A portion 32 of top wall 2 overlies the slides 28.

A second pair of discs 34 are mounted on a shaft 36 turnable in bearings 38. The axis of the shaft 36 is directed at right angles to that of the shaft 12. The discs 34 carry a plurality of partitions 40 forming grooves closed by the bottom walls 42 and extending lengthwise of the second drum formed by the discs 34. Within these partitions are spring clips 44 formed of bent wire and set in the bottom walls 42. The top wall 2 has a further opening 46 extending longitudinally of the axis of shaft 36. The width of opening 46 is substantially equal to space between partitions 40.

FIG. 6 shows one of the blocks which is used in connection with the device. This is an elongated block 48 of generally square cross-section, having letters 50 thereon which are preferably formed in such a way as to be felt by the fingers, being composed of sandpaper, velvet, felt or the like. The length of this block is equal to the width of the openings 22 and is such that it will fit between the spring clips 44. The blocks have in their ends permanent magnets 52 which will keep the blocks in place between the spring clips even though such clips may be somewhat loosened.

One of the discs 34 carries on its periphery numerals as indicated at 52 identifying the lesson, there being as many lessons as there are slats on the drum 16.

The drums can be turned by knobs 58 mounted on their respective shafts. These knobs being fitted in recesses 60 in the left-hand wall 4 and the front wall 6, respectively.

The right-hand wall 8 has an opening across the bottom portion thereof.

A drawer formed of a rear wall 62, a bottom wall 64 and a front wall 66 and provided with knob 68 is slidable into this opening, the front wall 66 closing the opening. The purpose of this drawer is to catch blocks which might accidentally fall out of the drum 34. The blocks are preferably colored differently, for example those representing the names of persons being red, action words being blue, and descriptive words being yellow.

The device 56 is also preferably provided with a tape playing device which may be housed within the space between the front wall and the drum 16 and below the slides 28 and the wall 32. This is intended to be played in order to issue instructions to the pupil.

In use, the drum 16 is turned to present one of the slats, for example that for lesson 2, below the openings 22. The drum 34 is then turned to the position also representing lesson 2. The blocks will be in the holders of drum 34, that is in the space between the partitions 40. The words on the blocks will be the same as the words on the slats, but the blocks will be arranged in random order, that is, the blocks will not be in the same order as the words shown on the slat 18.

The child is now instructed to feel the words successively, and at the same time the tape explains what the letters are, gives the sound of the letters, and pronounces the words. The words identified in the record are in the same order as the arrangement of the words in the drum 34. The child is then instructed to take the first block from the drum 34 and place it on the same word on the slat 18. He is told to do this successively for each of the ten words, until he has removed all of them to positions on the slat 18. He is then instructed to push the slides forward one by one so that the blocks are moved onto the strip 24 and the words on the slat 18 are then exposed. He is then told to check and correct any errors which he has made.

The child is then told to move the blocks back to their original positions on the slat 18. He may then be instructed to form sentences by moving blocks from their retracted positions on slat 18 to their proper positions on the strip 24 starting from the left. He is thus taught sentence structure, reading from left to right.

The child is then instructed to place the blocks in the holders on drum 34 at random.

It is advantageous to have the axes of the two drums at right angles to each other since the drum 16 permits the teaching of sentence structure and the comparison of a number of words at once while the drum 34 presents the words in word list form with which the child must also learn to work.

The top wall 2 forms a substantially horizontal member with a first row of openings 22 therein arranged in a line side-by-side. The slats 18 and strips 24 form two groups of substantially coplanar, horizontal surfaces beneath the openings. These surfaces are separated from each other along the center line of the openings, and each occupies about half the space beneath the openings. The surfaces of the slats 18 have symbols visible through the openings. The slides 28 are mounted for manual sliding towards and from the openings to overlie the slats 18. The blocks 48 have a length (horizontal dimension in FIG. 6) equal to the dimension equal to the width of one of the surfaces in a direction transverse to such line (vertical dimension in FIG. 6) and their height is sufficient to allow them to be engaged by the slides when they are placed on the slats 18.

The blocks actually are substantially square in cross section, that is, in a plane perpendicular to the plane of FIG. 6.

The slats constitute elongated members carried by an element (drums 16) mounted for turning about an axis parallel to the line of the openings.

The grooves formed by the strips 40 together with the metallic spring clips 44 constitute holding means for the blocks, which run parallel to the axis of rotation of the drum 34, and are visible through the opening 46. The axis of rotation of the drum 34 is perpendicular.

While I have described herein one embodiment of my invention, I wish it to be understood that I do not intend to limit myself thereby except within the scope of the claims hereto or hereinafter appended.

I claim:

1. A device for teaching comprising a substantially horizontal member having a plurality of openings therein arranged side-by-side in a line, means spaced below the lower surface of said horizontal member forming two groups of substantially coplanar, horizontal surfaces beneath said openings separated from each other along a line parallel to the line of the openings and each occupying about half the space beneath such openings, the surfaces of a first of said groups having symbols carried thereby visible through said openings, a plurality of slides, one for each of said openings, mounted below said horizontal member for manual sliding movement towards and from the spaces beneath said openings to overlie said first group of surfaces, and a plurality of blocks, one for each of said openings, having each a length equal to the dimension of the openings in the direction parallel to the line thereof and a dimension equal to the width of one of the surfaces in a direction transverse to said line and a height to allow engagement by the slides when positioned within the openings on the surfaces of the first group, said blocks bearing on one of their sides indicia corresponding to the indicia on the surfaces of the first group.

2. A device as claimed in claim 1 in which said member has further means for holding said blocks exposed above its surface in a row directed along a line substantially at right angles to said first line.

3. A device as claimed in claim 2 in which said holding means comprises means forming an upwardly open groove having metallic spring clips projecting upwardly therein engageable with said blocks.

4. A device as claimed in claim 3 in which said blocks have permanent magnets in their ends engageable with said spring clips.

5. A device as claimed in claim 2 which includes a first element rotatable about a first axis located below and parallel to the line of said openings having elongated members thereon providing the first group of surfaces and movable to be exposed through said openings, and said holding means includes a second element rotatable about an axis perpendicular to said first axis and having block-receiving grooves running longitudinally thereof, said member having an opening therein through which one of said grooves at a time is exposed.

6. A device as claimed in claim 5 in which said substantially horizontal member has a resilient metal strip running parallel to said first axis and underlying said first openings, the top surface of said strip constituting the second group of surfaces, said strip being engageable by said elongated members upon rotation thereof to be deflected upwardly but having a free edge which is normally no higher than the adjacent elongated member.

7. A device as claimed in claim 5, in which said block-receiving grooves have spring clips projecting upwardly therein engageable with said blocks.

8. A device as claimed in claim 1, which includes a first element rotatable about a first axis located below and parallel to the line of said openings having elongated members thereon providing the first group of surfaces and movable to be exposed through said openings.

9. A device as claimed in claim 8, in which said substantially horizontal member has a resilient metal strip running parallel to said first axis and underlying said openings, the top surface of said strip constituting the second group of surfaces, said strip being engageable by said elongated members upon rotation thereof to be deflected upwardly but having a free edge which is normally no higher than the adjacent elongated member.

References Cited

UNITED STATES PATENTS

| | | | |
|---|---|---|---|
| 2,722,061 | 11/1955 | Webster | 35—35 |
| 2,979,834 | 4/1961 | Giles | 35—73 |
| 3,089,258 | 5/1963 | Kavanagh et al. | 35—35 |
| 3,318,023 | 5/1967 | Myers | 35—35.4 |

FOREIGN PATENTS 1,147,658  6/1957  France.

LAWRENCE CHARLES, *Primary Examiner.*